July 12, 1966 W. H. OSTENBERG 3,260,192
NOTARY SEAL
Filed May 10, 1965 2 Sheets-Sheet 1

INVENTOR.
WILLIAM H. OSTENBERG
BY
ATTORNEY

July 12, 1966 W. H. OSTENBERG 3,260,192
NOTARY SEAL
Filed May 10, 1965 2 Sheets-Sheet 2

INVENTOR.
WILLIAM H. OSTENBERG
BY
ATTORNEY

United States Patent Office 3,260,192
Patented July 12, 1966

3,260,192
NOTARY SEAL
William H. Ostenberg, Miami, Fla., assignor to Notary Public Association of the State of Florida, Inc., a corporation of Florida
Filed May 10, 1965, Ser. No. 454,751
6 Claims. (Cl. 101—3)

This invention relates to impression seals, and more particularly to the type used by notaries public and others, and one of the objects of the invention is to provide means by which a seal of this kind can be rendered more compact and portable and particularly by separation of parts of the same.

It is an object of the invention to provide a seal of this character with a detachable operating lever or handle, and which when detached and removed from its normal die-operating position, can be fitted in a storage position on the base or bottom of the seal, thereby materially reducing the overall size of the seal and rendering it more compact for portability or storage.

More particularly, the invention contemplates the provision of an impression seal having a body or base member provided with impression dies, one of which is movable by means of a pivoted lever or handle, the pivotal connection of the handle to the body or base being such as to permit the handle to be detached from the body. The bottom of the body and the handle are provided with interfitting parts whereby the handle, when separated from its pivotal connection to the body, can be fitted on the bottom of the body in a storage position. Since the shape of the handle and the bottom of the body are substantially alike, the addition of the handle to the bottom of the body places the handle in a storage position where it materially reduces the size of the seal as a whole and therefore renders it more compact for carriage and storage or shipment.

With these and other objects to be hereinafter set forth in view, I have devised the arrangement of parts to be described and more particularly pointed out in the claims appended hereto.

Figure 1:
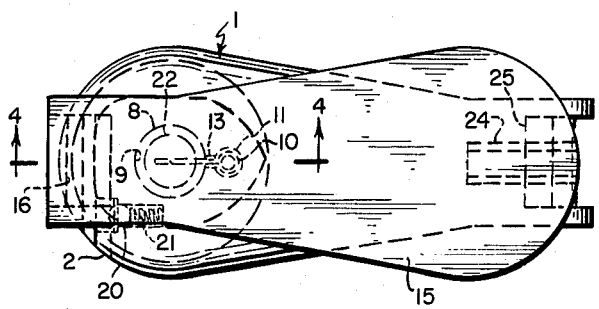
Figure 2:
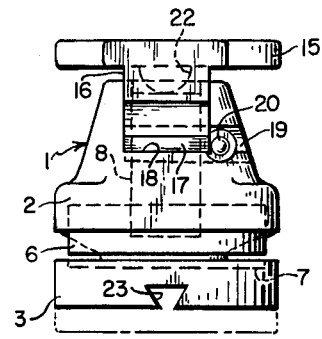
Figure 4:
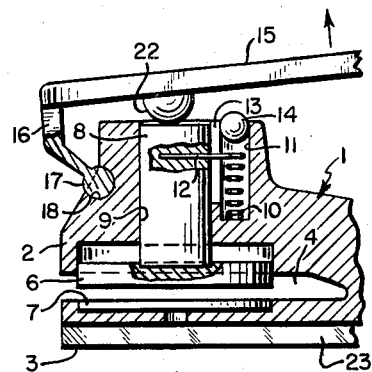
Figure 3:
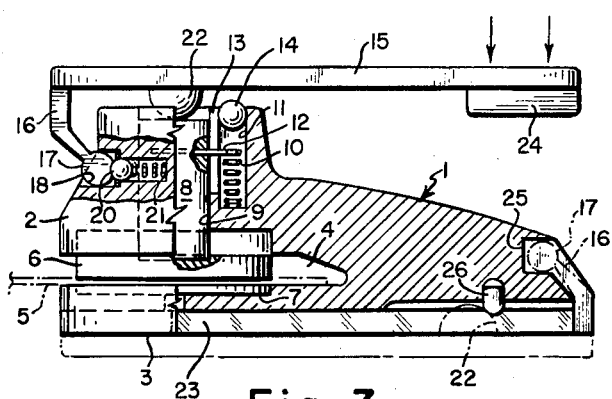
Figure 6:
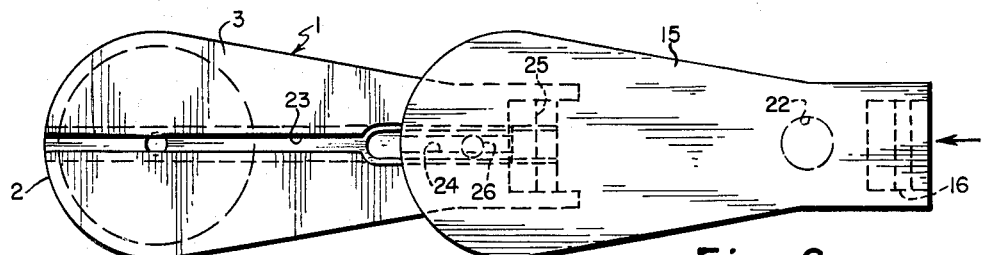
Figure 5:
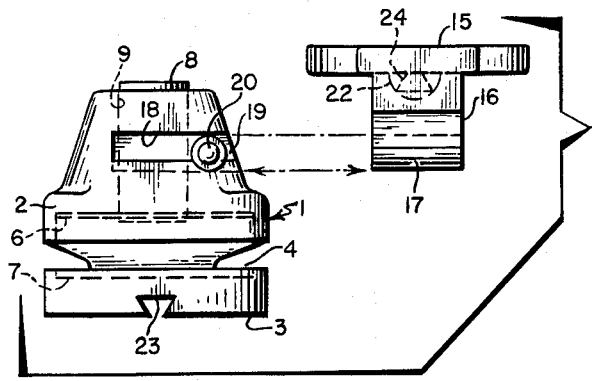
Figure 7:
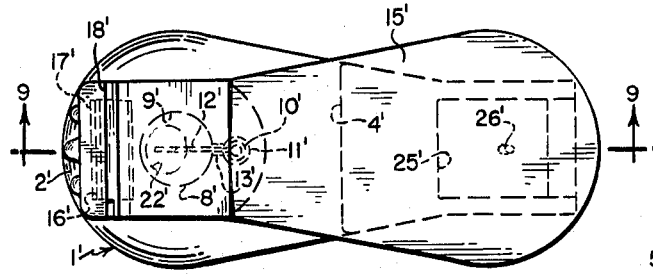
Figure 8:
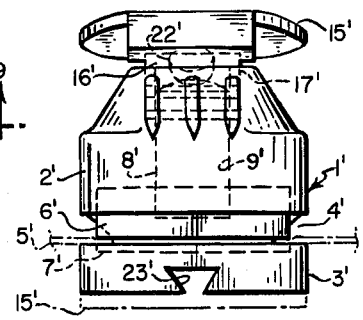
Figure 10:
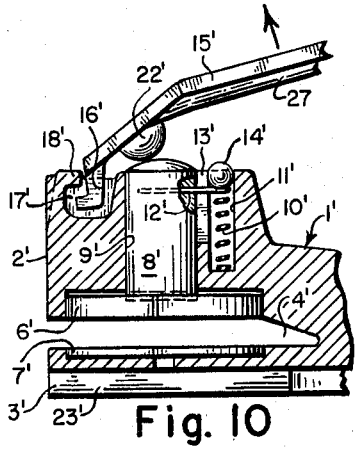
Figure 9:
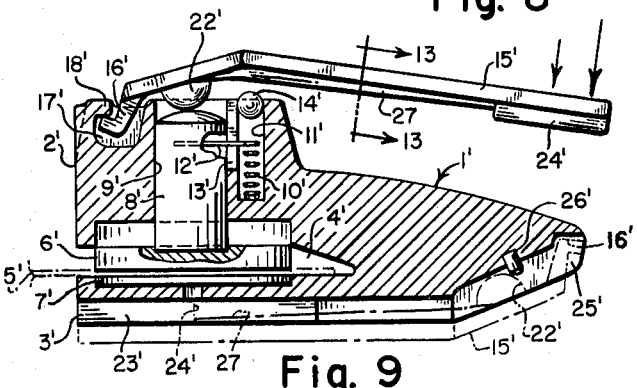
Figure 12:
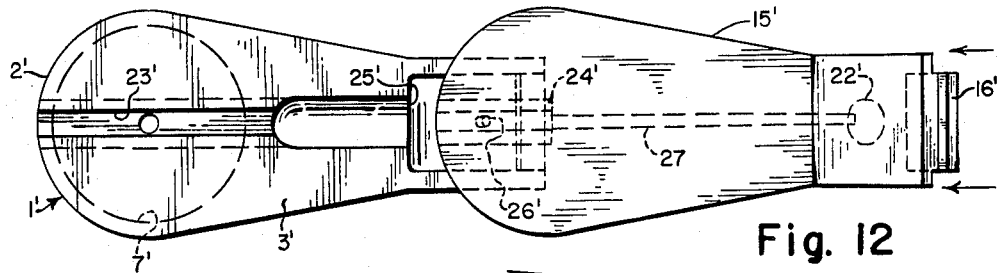
Figure 11:
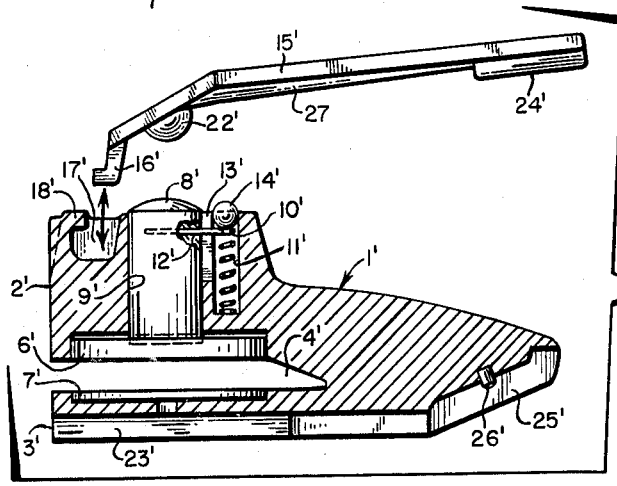
Figure 13:

In the accompanying drawing, wherein an illustrative embodiment of the invention is disclosed, FIG. 1 is a top plan view of an impression seal constructed in accordance with the invention, FIG. 2 is a front elevational view of the same, FIG. 3 is a vertical sectional view through the seal, showing in dotted lines how the detachable handle can be fitted on the bottom of the body of the seal, FIG. 4 is a sectional view, taken substantially on the line 4—4 of FIG. 1, looking in the direction of the arrows, FIG. 5 is a front elevational view of the seal, showing how the operating lever or handle is detached, FIG. 6 shows the operating handle in the position of being slid along the bottom of the body or base to place it in its storage position, FIG. 7 is a top plan view of a modified form of impression seal, FIG. 8 is a front end view thereof, FIG. 9 is a longitudinal section taken substantially on line 9—9 of FIG. 7, FIG. 10 is a fragmentary sectional view showing the assembly of the operating lever, FIG. 11 is a composite sectional view showing the method of assembling the handle with respect to the head portion of the seal, FIG. 12 is a bottom plan view showing the handle in the position of being shifted along the bottom or body of the base to place it in its storage position, and FIG. 13 is a fragmentary section taken substantially on line 13—13 of FIG. 9.

Referring to the drawings and particularly FIGS. 1–6 inclusive, 1 indicates generally the body of an impression seal such as is used for example by notaries public and others. The general shape and formation of this type of seal is conventional, the same having a forward head portion 2 and a base portion 3, these parts defining a slot 4 between them and into which a paper or document 5 is inserted to be impressed between the dies 6 and 7 in the known manner.

The movable die 6 is carried by a plunger 8 that is vertically slidable through a passage 9 in the head 2, the plunger 8 being spring-biased upwardly by a coil spring 10 to thereby maintain the movable die 6 in its raised position substantially as shown in FIG. 4. The coil spring 10 is located in a recess 11 and at its upper end is extended laterally to form a pin 12 that is engaged into an opening at one side of the plunger 8 and prevents rotation of the plunger. The extended end of the spring 10 passes through a slot 13 and a ball 14 limits the upper movement of the spring 10 to completely recess the die 6 into the body 2 to completely open the slot 4. The pin 12 enters the recess 11 through slot 13. The recess 11 is closed at the top by a ball 14.

The operating lever or handle for depressing the plunger 8 and the movable die 6 carried by it, consists of a lever 15 which is substantially of the same outline as the bottom of the base portion 3. The lever or handle 15 is provided at its forward end with a hook portion 16 which extends downwardly and inwardly and terminates at its end in a cylindrical bead 17 that is accommodated in a groove 18 formed in and extending crosswisely of the head portion 2 near the top thereof. Said groove 18 is open at one end as shown at 19 in FIG. 5 to permit the cylindrical bead 17 on the handle to be slid into said groove 18 or removed therefrom as indicated by the arrows in FIG. 5 and becomes therefor a captive ball and socket.

A detent in the form of a ball 20, biased by a spring 21, frictionally holds the handle against undesirable pivotal movement or looseness in its groove. On its under surface the handle 15 is provided with a rounded projection 22 for contact with the upper end of the plunger 8 to depress the same when the handle is depressed as shown by the arrow in FIG. 3. The cylindrical head 17 is locked within the groove 18 by the ball 20 and in such position positions the rounded projection 22 in direct axial alignment with the plunger 8.

The arrangement thus far described is one by which the handle 15 is made separable from the body of the seal by sliding the handle therefrom in the manner shown in FIG. 5. For easy transportation, for carrying in the pocket or brief case, shipping and storage, it is desirable that the seal be made as small and compact as follows. The handle or lever in its normal die-operating position, constitutes a projecting element which materially increases the size of the seal. By being able to remove the handle from its operative position and attaching it in a storage position on the bottom of the base 1, the seal is rendered very compact and useful for the purposes above mentioned.

Provided in the base portion 3 of the body and extending centrally and longitudinally thereof, is a dovetail slot 23 which received a complementarily shaped rib 24 provided on the under face of the lever or handle 15 at its free end. The rear end of the base or body is slotted as shown at 25 in FIG. 3, to accommodate the hook-shaped part 16 and the rounded bead 17 thereon. The bottom of the base is provided with a detent 26.

From the foregoing, the structure and operation of the improved impression seal will be readily apparent. In its assembled condition, or when the handle or lever 15 is attached in its operative position as shown in FIGS. 1 to 3, the seal is used in the conventional manner namely, by depressing the handle or lever against the bias of the spring 10, while a paper or document to be impressed is positioned between the dies 6 and 7.

When it is desired to reduce the overall size of the seal, the handle 15 is detached by sliding its bead 17 out of the groove 18 in the manner shown in FIG. 5 and then attaching it to the bottom of the base portion 3. This is done by placing the handle against the bottom of the base as shown in FIG. 6 and sliding it toward the left or in the direction of the arrows. The rib 24 on the handle or lever will enter the dovetail slot 23 and the hooked part 16 and bead 17 thereon will enter the recess 25. The detent 26 entering into engagement behind the rounded projection 22 will prevent the inadvertent separation of the handle from the bottom of the base.

Referring now to FIGS. 7–13, 1' indicates generally the body of an impression seal such as is used for example by notaries public and others. The general shape and formation of this type of seal is conventional, the same having a forward head portion 2' and a base portion 3', these parts defining a slot 4' into which paper or documents 5' may be inserted to be impressed between the dies 6' and 7' in the known manner. The movable die 6' is carried by a plunger 8' that is vertically slidable through a cylindrical passage 9' in the head 2'. The plunger 8' being spring biased upwardly by a coil spring 10' to thereby maintain the movable die 6' in its raised position substantially as shown in FIG. 10. The coil spring 10' is located in a recess 11' and at its upper end is extended laterally to form a pin 12' that is engaged into an opening at one side of the plunger 8' and prevents rotation of the plunger. The extended end of the spring 10' passes through a slot 13' and a ball 14' limits the upward movement of the spring 10' to completely recess the die 6' into the body 2' to completely open the slot 4'.

An operating lever or handle for depressing the plunger 8' and the movable die 6' carried by it, consists of a lever 15' which is substantially of the same outline of the base 3'. The lever or handle 15' is provided at its forward end with a hook portion 16' which extends downwardly and inwardly for entry into a cavity 17' formed in the head 2' and with the hook adapted to engage an overlying cooperating hook 18', formed upon the head and extending inwardly to partially overlie the cavity 17'. The hook 16' and the cooperating hook 18' constitutes a means for disposing the handle 15' in an operative position with respect to the body 1'. The assembly and disassembly of the handle 15' with respect to the body 1' is illustrated generally in FIG. 11. On the undersurface, the handle 15' is provided with a rounded projection 22' for contact with the upper end of the plunger 8' to depress the same when the handle is depressed, as shown in FIG. 9. With the handle in hooked position with the hook 18', the rounded projection 22' overlies the plunger 8 substantially axially thereof.

The arrangement shown with respect to the modified form of the invention illustrates the handle 15' as being separable from the body 1' by swinging the handle 15' upwardly and forwardly and lifting the hook 16' from the cavity 17' basically being a die having a separable handle similar to the first form of the device. By being able to remove the handle from its operative position and attaching it in a storage position on the bottom of the base 3', the seal is rendered very compact and useful for the purposes mentioned.

Provided in the base portion 3' of the body and extending centrally and longitudinally thereof is a dovetail slot 23' which receives a complementarily shaped rib 24' provided on the underface of the handle 15' at its free end. The rear end of the base 3' is slotted at 25', shown in FIGS. 9 and 11, to accommodate the forwardly angled end of the handle 15' and its hook 16', together with the rounded projection 22'. The slot 25' carries a detent 26' to be overridden by the projection 22' and to hold the handle in a storage position upon the bottom 3' of the seal.

From the foregoing, the structure and operation of this form of the invention will be readily apparent. In its assembled condition, or when the handle or lever 15' is attached in its operative position as shown in FIGS. 7, 8, 9 and 10, the seal is used in the conventional manner namely, by depressing the handle or lever to cause the projection 22' to be biased against the top of the plunger 8' and to force the plunger and its attached die 6' downwardly against the tension of the spring 10', and as the pressure is exerted upon the plunger 8', the die 6' is forced into stamping position with respect to the die member 7' and to impress any documents that may be inserted through the slot 4'. The movement of the handle 15' to the operative position for stamping is shown clearly in FIG. 9 and after an impression has been made upon the paper 5', the handle may be released and permitting the spring 10' to bias the plunger 8', upwardly and in its uppermost position, the die 6' is fully fitted within a recess 6a and with the face of the die being substantially flush with the marginal edge of the recess.

When it is desired to reduce the overall size of the seal, the handle 15' is detached from its engagement with the hook 18' and bodily removed and then attached to the bottom of the base portion 3'. This is done by placing the handle against the bottom of the base, as shown in FIG. 12 and sliding it toward the left in the direction of the arrows. The rib 24' on the bottom of the handle will enter the dovetail slot 23' and the hooked part 16' and the projection 22' thereon will enter the recess 25. The detent 26' entering into engagement behind the rounded projection 22' will prevent the inadvertent separation of the handle from the bottom of the base. The underside of the handle 15, may be further reinforced against flexing by a rib 27.

It will be apparent that when the handle or lever is attached to the bottom of the base in the manner described, the overall size of the seal will be materially reduced, enabling it to be more readily accommodated in the pocket, brief case or elsewhere. It also permits the seal to be very readily and easily packed for shipment.

Having thus described a single embodiment of the invention, it is obvious that the same is not to be restricted thereto, but is broad enough to cover all structures coming within the scope of the annexed claims.

What I claim is:

1. A seal of the character described comprising, a body having impression dies, a handle pivoted on the body for moving one of the dies toward a companion die, the pivotal connection between the handle and the body being such as to permit the handle to be detached from the body, the bottom of the body and the handle being provided with interfitting parts by which the handle can be attached in a storage position on the bottom of the body.

2. A seal according to claim 1, wherein the handle is substantially of the same shape as the outline of the bottom of the body, the bottom of the body having a groove and the handle having a part fitting into said groove.

3. A seal according to claim 2, wherein the bottom of the body is provided with a detent and the handle has a projecting part engaged thereby to prevent the handle from slidably separating from the body.

4. A seal of the character described comprising, a body carrying impression dies, a handle pivotally mounted on the body for moving one of the dies toward a companion die, the pivot consisting of a transverse groove in the body and a head on the handle fitting into said groove, the groove being open at one end to permit the handle to be separated from the body by slidably moving the head out of the open end of the groove, the bottom of the body having a groove, the under side of the handle having a rib fitting into said groove so that the handle can be attached to the bottom of the body in a storage position.

5. A seal as provided for in claim 4, wherein detent means is provided in the transverse groove for holding the bead on the handle therein, the groove in the bottom of the body being dovetail in shape, and detent means in the latter groove for engaging the handle and restraining it from sliding movement when it is attached to the bottom of the body.

6. A seal of the character described comprising, a body having a flat under surface, a dovetail groove extending centrally and longitudinally in said surface, an operating lever having a rib complementary to said groove fitting in said groove when the lever is disposed against the bottom of the body in a storage position, the handle terminating in a hook-shaped forward end provided with a bead, the body having a groove in its front end into which said bead enters to pivotally attach the lever in die operating position, and the body having a groove in its rear end into which the hook-shaped end and head enters when the lever is disposed against the bottom of the body in a storage position.

References Cited by the Examiner

UNITED STATES PATENTS

| | | | |
|---|---|---|---|
| 1,679,029 | 7/1928 | Gibson | 101—3 |
| 2,920,559 | 1/1960 | Becker | 101—405 |
| 2,939,385 | 6/1960 | Wolberg | 101—3 |

ROBERT E. PULFREY, *Primary Examiner.*

WILLIAM McCARTHY, *Assistant Examiner.*